(12) United States Patent
Ohta et al.

(10) Patent No.: US 7,767,155 B2
(45) Date of Patent: Aug. 3, 2010

(54) MICROREACTOR APPARATUS HAVING INTEGRAL CONNECTORS

(75) Inventors: Tetsuo Ohta, Kanagawa (JP); Seiichi Takagi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 497 days.

(21) Appl. No.: 11/706,368

(22) Filed: Feb. 15, 2007

(65) Prior Publication Data

US 2008/0031790 A1    Feb. 7, 2008

(30) Foreign Application Priority Data

Jul. 18, 2006 (JP) ............................ P2006-195154

(51) Int. Cl.
*B01L 99/00* (2010.01)
*G01N 33/00* (2006.01)
(52) U.S. Cl. ....................... 422/103; 422/68.1; 422/240
(58) Field of Classification Search ............... 422/68.1, 422/103, 240
See application file for complete search history.

(56) References Cited

U.S. PATENT DOCUMENTS 6,273,478 B1 * 8/2001 Benett et al. ................. 285/346
2004/0096359 A1 * 5/2004 Sarrut et al. ................... 422/63

FOREIGN PATENT DOCUMENTS

JP    A-2004-150891    5/2004
JP    U-3110712       6/2005

* cited by examiner

*Primary Examiner*—Walter D Griffin
*Assistant Examiner*—Lessanework Seifu
(74) *Attorney, Agent, or Firm*—Oliff & Berridge, PLC

(57) ABSTRACT

A microreactor apparatus includes; a microreactor body that includes first and second substrates; a microchannel that is formed inside the microreactor body; and integral connectors that are disposed detachably on the microreactor body, and through which supply/discharge pipes are to be connected to end portions of the microchannel, respectively.

8 Claims, 6 Drawing Sheets

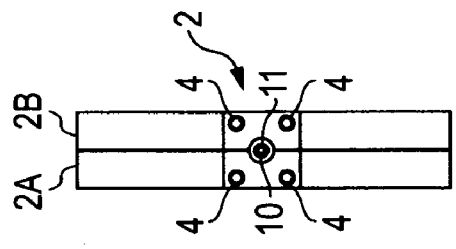
FIG. 1C
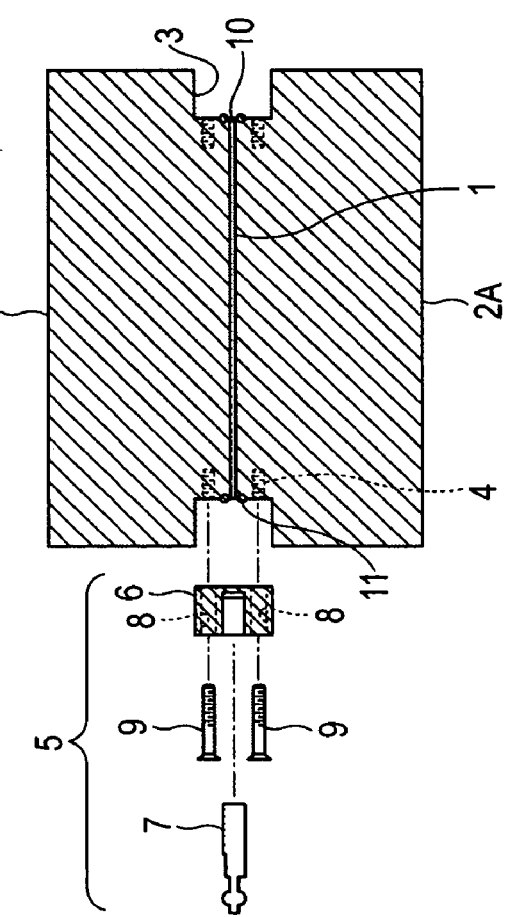
FIG. 1B
FIG. 1A

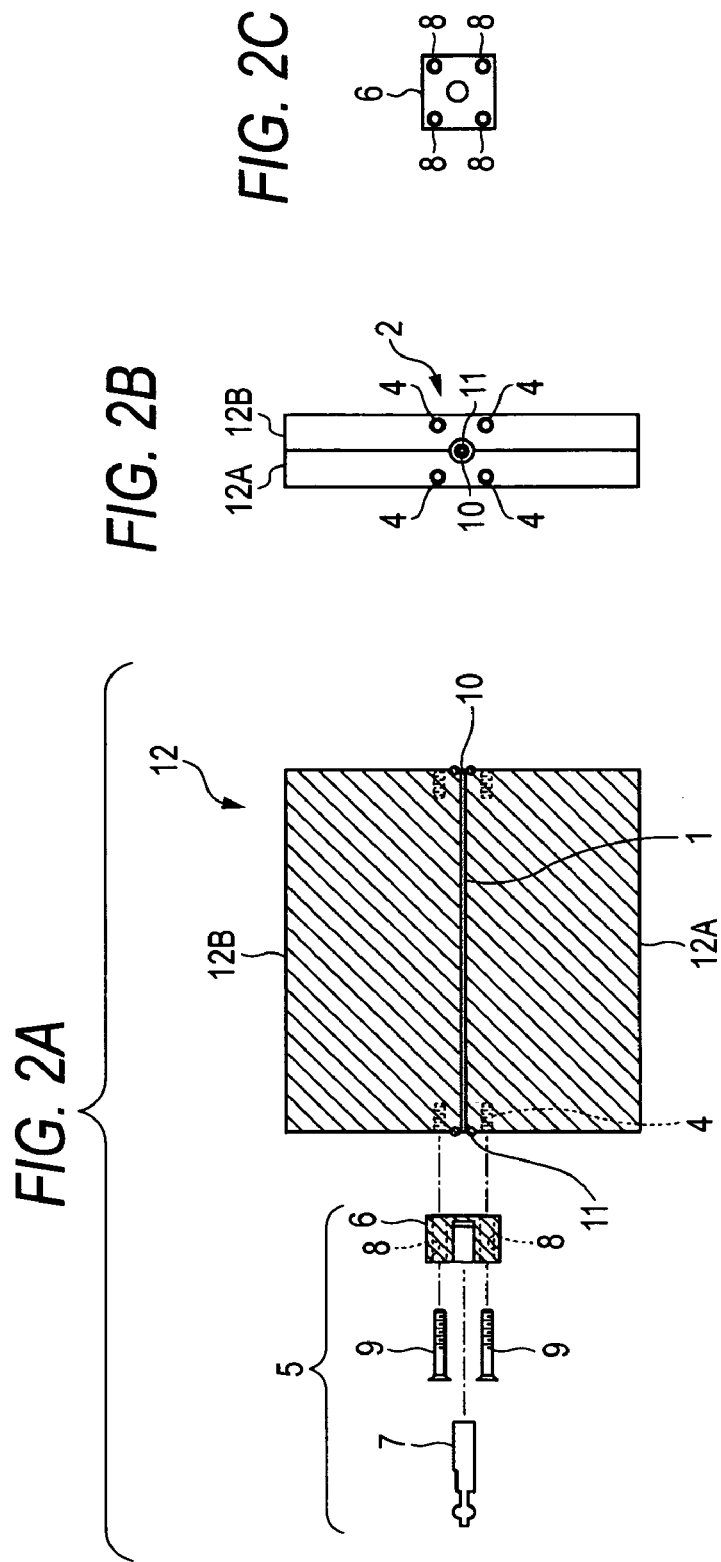

MICROREACTOR APPARATUS HAVING INTEGRAL CONNECTORS

CROSS-REFERENCE TO RELATED APPLICATIONS

This application is based on and claims priority under 35 U.S.C. 119 from Japanese Patent Application No. 2006-195154 filed Jul. 18, 2006.

BACKGROUND

1. Technical Field

The present invention relates to a microreactor apparatus having integral connectors through which supply/discharge pipes for supplying or discharging a reaction fluid (liquid or gas) to the microreactor apparatus are to be connected to the microreactor body.

2. Related Art

A microreactor is a generic name of a small reactor which is also called a microchannel reactor or a microfluid device, and which typically has a microchannel of several to several hundreds of micrometers. Most of chemical reactions using a microreactor are carried out in a flow system. As a microreactor body for forming a microchannel, various materials such as glass, plastic, metal, and silicon can be used. In order to observe a flow or reaction behavior in a microchannel from the outside, it is convenient to use a transparent material such as glass or plastic.

SUMMARY

According to an aspect of the present invention, a microreactor apparatus comprising: a microreactor body that includes first and second substrates; a microchannel that is formed inside the microreactor body; and integral connectors that are disposed detachably on the microreactor body, and through which supply/discharge pipes are to be connected to end portions of the microchannel, respectively.

BRIEF DESCRIPTION OF THE DRAWINGS

Exemplary embodiment of the present invention will be described in detail based on the following figures, wherein:

FIGS. 1A to 1C are conceptual diagrams showing an example of the microreactor apparatus of the invention in which integral connectors of an embedded type are disposed;

FIGS. 2A to 2C are conceptual diagrams showing an example of the microreactor apparatus of the invention in which integral connectors of a protrusion type are disposed;

DETAILED DESCRIPTION

Figure 3:
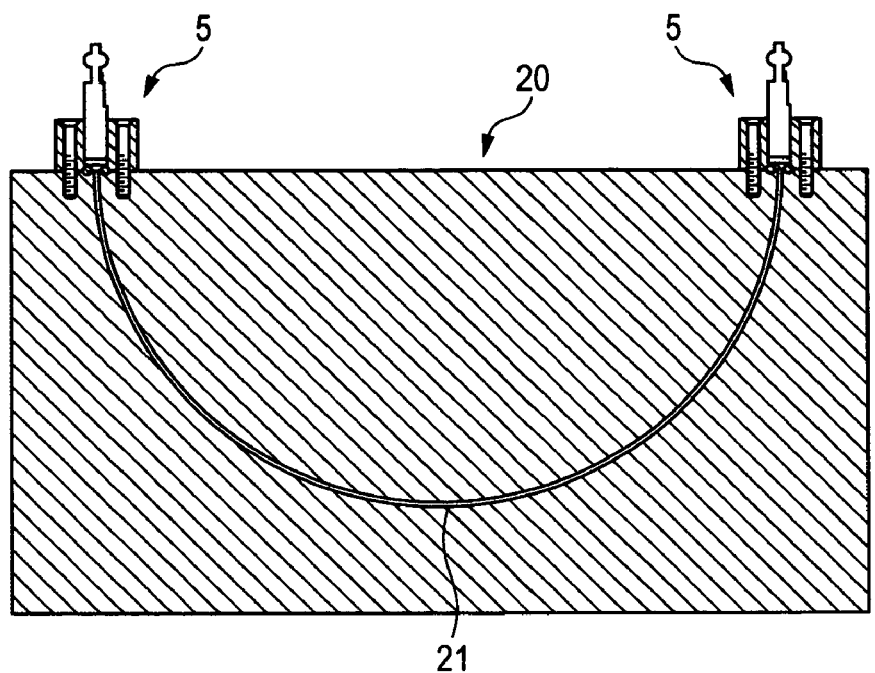
FIG. 3 is a conceptual diagram showing an example of the microreactor apparatus of the invention in which a semicircular microchannel is disposed.

The microreactor apparatus of the invention is characterized in that the microreactor apparatus has: a microreactor body; a microchannel which is formed in the microreactor body; and integral connectors which are disposed detachably on the microreactor body, and through which supply/discharge pipes are to be connected to end portions of the microchannel, respectively.

Hereinafter, the microreactor apparatus of the invention will be described with reference to the accompanying drawings.

FIG. 1 is a conceptual diagram showing an example of the microreactor apparatus of the invention. A microreactor body 2 is formed by bonding two rectangular acrylic resin plates 2A and 2B. A linear channel in which the width is 500 μm and the depth from the surface is 100 μm is formed in a substantially middle of the bonding surface of the acrylic resin plate 2A. A microchannel 1 is formed by bonding the acrylic resin plate 2A to the other rectangular acrylic resin plate 2B.

Cutaway portions 3 are formed in the microreactor body 2 by cutting away a rectangular parallelepiped shape portions including the vicinities of the both ends of the microchannel 1. In each of the cutaway portion 3, four threaded holes 4 are disposed with being centered at an end portion 10 of the microchannel. Integral connectors 5 can be detachably attached to the cutaway portions 3 of the microreactor body 2, respectively.

Each of the integral connectors 5 is configured by a connector body 6, and a joint member 7 through which a supply/discharge pipe is to be connected to the connector body 6. Four through hole a are formed in the connector body 6, and the integral connector 5 can be attached air-tightly or liquid-tightly to the microreactor body 2 by fixing screws 9. An annular closing member 11 configured by an elastic member is attached between the integral connector 5 and the end portion of the microchannel of the microreactor body 2, thereby ensuring a hermetical sealing property.

Although the material of the microreactor body which is used in the invention can be freely selected from glass, plastic (synthetic resin), metal, semiconductor, and the like, transparent plastic (synthetic resin) may be preferably selected. An acrylic resin plate can be easily processed, and hence preferably used in the invention. An example of an acrylic resin plate is KURALEX S manufactured by NITTO RESIN INDUSTRIES.

In the embodiment, the microchannel means a channel in which the width or diameter is preferably several to several hundreds of μm. Although the microchannel may have a width or diameter of about 100 μm to about 2.0 mm, it is particularly preferable to set the width or diameter to 100 to 500 μm.

In the case where the width or diameter of the microchannel is within the above-mentioned numeric range, even when a particle dispersion liquid is flown, the microchannel is not clogged by deposition of particles, and a stable streamline flow can be formed.

The microchannel can be formed by various methods. For example, plates having a semicircular recess in the bonding surface are molded by injection molding of a synthetic resin, and the plates are bonded together to form a circular microchannel. Alternatively, a recess of a desired shape may be formed by microprocessing in the surface of at least one of two synthetic resin plates to be bonded, and the plates may be bonded together to form a microchannel. Specific examples of microprocessing means which is useful in the formation of the microchannel are an end mill, etching, a YAG laser, a UV laser, etc.

In the case where a microchannel is formed in the surface of a synthetic resin plate and thereafter the surfaces of two synthetic resin plates are bonded, various known methods such as thermal fusion, adhesion by an adhesive agent, and ultrasonic fusion bonding may be employed. In the bonding of acrylic resin plates, ultrasonic fusion bonding or the like is preferably used, and diffusion bonding is particularly preferable.

Each of the integral connectors is configured by the connector body constituting a substrate of the integral connector, and the joint member through which the supply/discharge pipe can be connected to the connector body.

In the invention, "supply/discharge pipes" mean pipes (a synonym of "tubes") through which a reaction fluid is to be supplied (a synonym of "introduced" or "injected") and discharged (a synonym of "recovered") to and from the microreactor body.

Although the material of the connector body of the integral connector which is used in the invention can be freely selected from glass, plastic (synthetic resin), metal, and the like, transparent plastic (synthetic resin) may be preferably selected. The processing or molding of the connector body or joint member may be performed by machining, or by injection molding of a thermoplastic synthetic resin.

In the invention, as the material of the supply/discharge pipes, glass, rubber, plastic (synthetic resin), metal, and the like can be used. Preferably, plastic (synthetic resin) is used, and polyethylene, polypropylene, nylon, polyvinyl chloride, polyvinylidene chloride, polyvinyl acetate, polyacrylic acid, polymethacrylic acid, polyvinyl alcohol, silicone resin, fluorine resin, their derivatives or copolymers, or the like may be preferably selected. In order to improve the durability or the functionality, the supply/discharge pipes may have a multi-layer structure so as to perform functional separation. The supply/discharge pipes have an inner diameter of several μm to several mm. In order to withstand the pressure of the liquid in supply/discharge, the outer diameter of the supply and discharge pipe is preferably larger by several hundreds of μm to several mm than the inner diameter.

In the integral connectors, preferably, the joint members are attachable and detachable to and from the connector bodies. In FIG. 1, for example, a cylindrical joint member having a channel along the center axis can be screwed by means of screw heads disposed on the outer periphery of a connecting portion to screw grooves disposed in the connector body. As required, a closing member (O-ring or the like) having elasticity may be used between the connector body and the joint member. A pipe connecting portion for connecting the supply/discharge pipe is disposed in an end portion of the joint member. The integral connectors and the joint members may be configured as several embodiments. Embodiments other than the embodiment of FIG. 1 are exemplified in examples below.

In the invention, preferably, the integral connectors are detachably fixed to the microreactor body.

The manner of fixing the integral connectors to the microreactor body may be any of a protrusion type, an embedded type, and an intermediate type. In the protrusion type, the microreactor body has a rectangular shape, and the integral connectors are externally fixed to the microreactor body. By contrast, the embedded type in which portions to which the integral connectors are to be fixed are cut away in a recessed manner, and the integral connectors are embedded into the portions may be used. Alternatively, a partial embedded type which is an intermediate between the protrusion type and the embedded type may be employed.

In a connecting portion between the microreactor body and each of the integral connectors, in order to ensure a smooth fluid flow in the microchannel, the integral connector is preferably disposed so that the center axis of the joint member coincides with a tangential direction of the microchannel in an end of the microchannel in the microreactor body. As shown in Example 3, in the case of a semicircular microchannel, the integral connectors are disposed so that tangential directions of end portions of the microchannel coincide with the directions of the supply/discharge pipes.

Preferably, the annular closing members 11 configured by an elastic member are clamped between the end portions of the microchannel of the microreactor body 2 and the integral connector 5 to ensure the hermetically sealing property. The elastic members used in the closing members are not particularly restricted. Examples of the material of the elastic members are urethane rubber, silicone rubber, and fluorine rubber.

EXAMPLES

Example 1

As shown in FIG. 1, the two rectangular acrylic resin plates 2A and 2B (KURALEX S manufactured by NITTO RESIN INDUSTRIES: 76 mm in length×100 mm in width×8 mm in height) were superimposed on each other. As attaching portions to which the integral connectors are to be attached, two portions of a size of 16 mm in length×16 mm in width×8 mm in height were cut away from side face portions of the resin plates including the overlapping portion as the center, so that two opposing cutaway portions are formed. Then, the microchannel (width: 500 μm, depth: 100 μm) was linearly formed in the acrylic resin plate 2A by using an end mill. Thereafter, the acrylic resin plates 2A and 2B were ultrasonic fusion bonded together by diffusion bonding, thereby producing the microreactor body having the microchannel in the bonding surface.

In order to fix each of the integral connectors to the microreactor body, in the corresponding one of the cutaway portions of the microreactor body, four places centered at the end portion of the microchannel were bored by a drill to form holes (φ3 mm), and then threaded. In an acrylic resin block (16 mm in length×16 mm in width×8 mm in height) which is used as the connector body of the integral connector, a hole (φ5 mm×9 mm in depth) into which the joint member for connecting the supply/discharge pipe is to be fitted was formed and then threaded. In the connector body, centered at this threaded hole, four through holes (φ5 mm) were formed by using an end mill on the extensions of the threaded holes of the microreactor body. The integral connector to which the joint member is connected was fixed by fixing screws to the microreactor body via an O-ring (outer diameter: φ3.5 mm, inner diameter: φ1.0 mm).

The supply/discharge pipes (outer diameter: φ3 mm, inner diameter: φ2 mm, material: silicone resin) were connected to the microreactor apparatus, and then a liquid toner dispersion was supplied by a syringe pump to the apparatus. The liquid supply was stably performed for eight hours without causing clogging.

Example 2

A microreactor apparatus was produced in the same manner as Example 1 except that, as shown in FIG. 2, the two attaching portions for the integral connectors are not cut away. As a result, the microreactor apparatus in which the integral connectors are attached while being projected from side faces of a microreactor body 12 was obtained.

The operability was identical with that of Example 1.

Example 3

As shown in FIG. 3, a semicircular microchannel 21 was formed in a microreactor body 20, and the integral connectors 5 were disposed so that tangential directions of channel end portions coincide with the directions of the supply/discharge pipes. A microreactor apparatus was produced in the same manner as Example 2 in the other points.

The operability was identical with that of Example 2.

Example 4

Figure 4A:
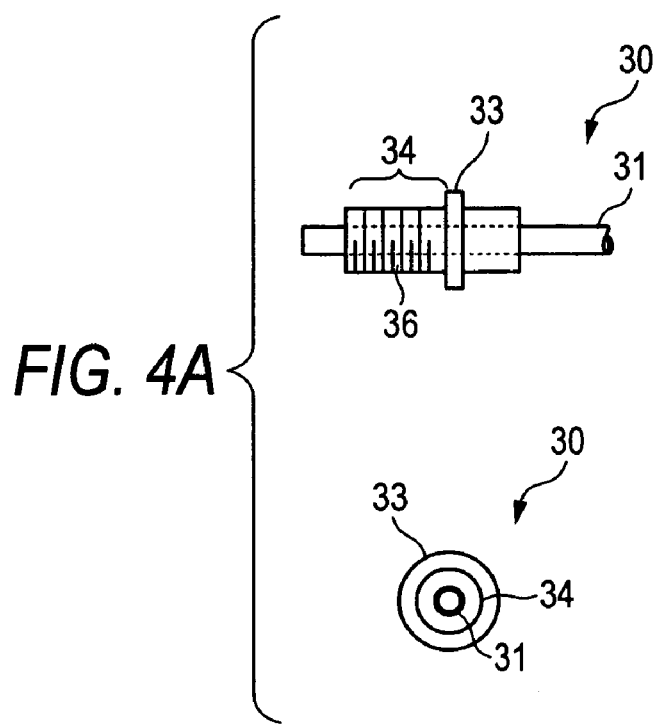
FIGS. 4A to 4C are conceptual diagrams showing another example of a joint member which is used in the integral connectors in the microreactor apparatus of the invention.
Figure 4B:
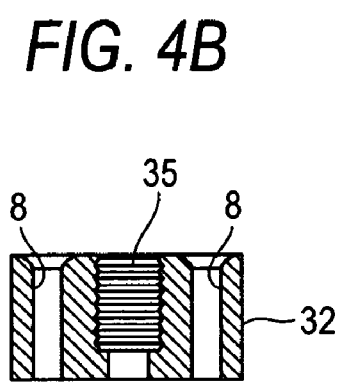
Figure 4C:
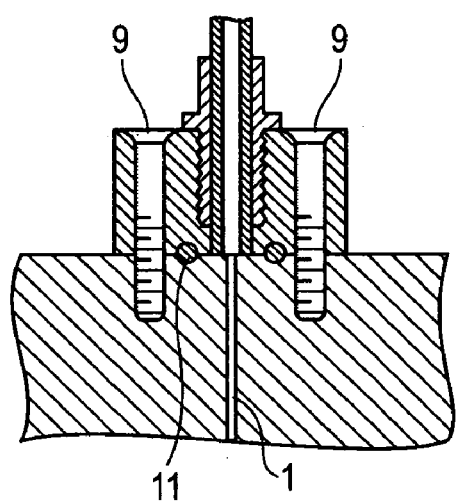

A supply/discharge pipe 31 can be inserted and fixed into a joint member 30 shown in FIG. 4(A) while being passed through the center axis of the member. In the outer periphery of an attaching portion 34 which is smaller in diameter than a circular flange portion 33 that is to butt against a side face of a connector body 32, screw threads 36 were formed so as to correspond to screw grooves 35 formed in the connector body 32 shown in FIG. 4(B). FIG. 4(C) shows an example of an integral connector to which the joint member 30 is connected. A microreactor apparatus was produced in the same manner as Example 2 in the other points.

The operability was identical with that of Example 2.

Example 5

Figure 5:
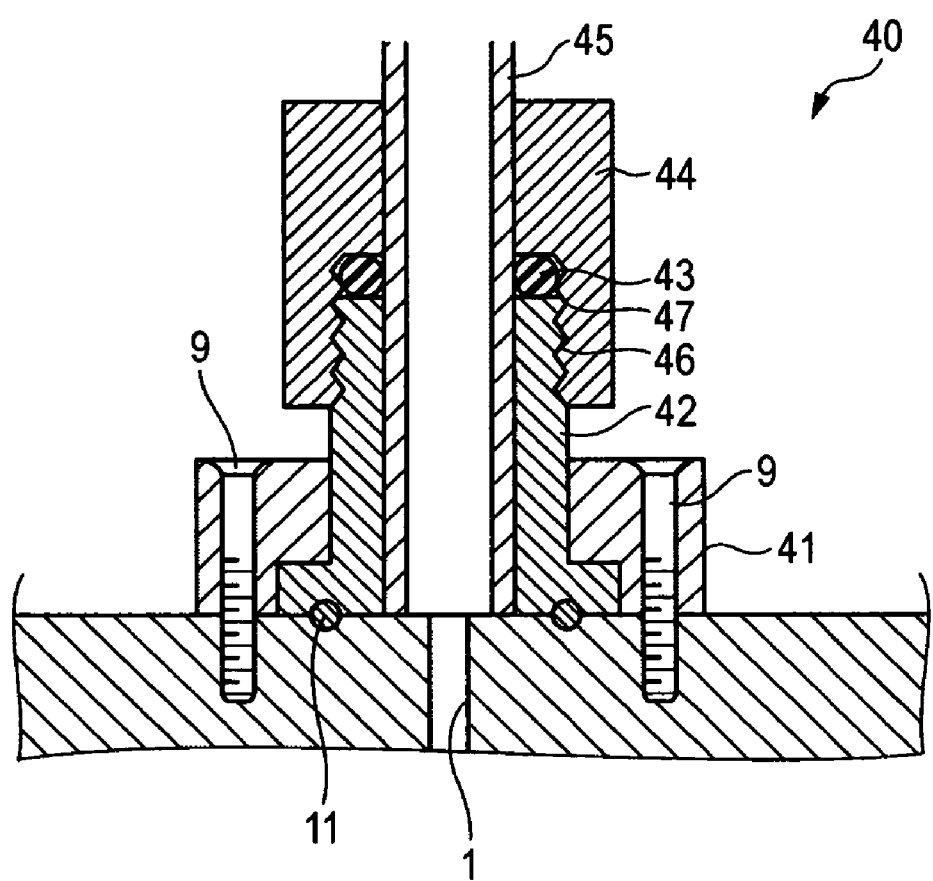
FIG. 5 is a conceptual diagram showing a further example of the joint member which is used in the integral connectors in the microreactor apparatus of the invention.

As shown in FIG. 5, an attaching portion 42 which is for a supply/discharge pipe, and in which screw threads 46 are formed was disposed on a connector body 41 so as to be projected from the connector body. An auxiliary attaching member 44 in which an annular seal member 43 is housed, and screw grooves 47 are disposed so as to correspond to the screw threads 46 was mounted on a tip end portion of the supply/discharge pipe. The supply/discharge pipe was attached so that the auxiliary attaching member 44 surrounds the outer periphery of the attaching portion 42, and the supply/discharge pipe 45 is inserted into the attaching portion 42. Thereafter, the auxiliary attaching member 44 is screwed while rotating the screw grooves 47 along the screw threads 46 disposed on the attaching portion 42, so that a gap between the supply/discharge pipe 45, the attaching portion 42, and the auxiliary attaching member 44 is sealed by the annular seal member 43 disposed in the auxiliary attaching member 44. A microreactor apparatus was produced in the same manner as Example 1 in the other points.

The operability was identical with that of Example 2.

Comparative Example 1

Figure 6:
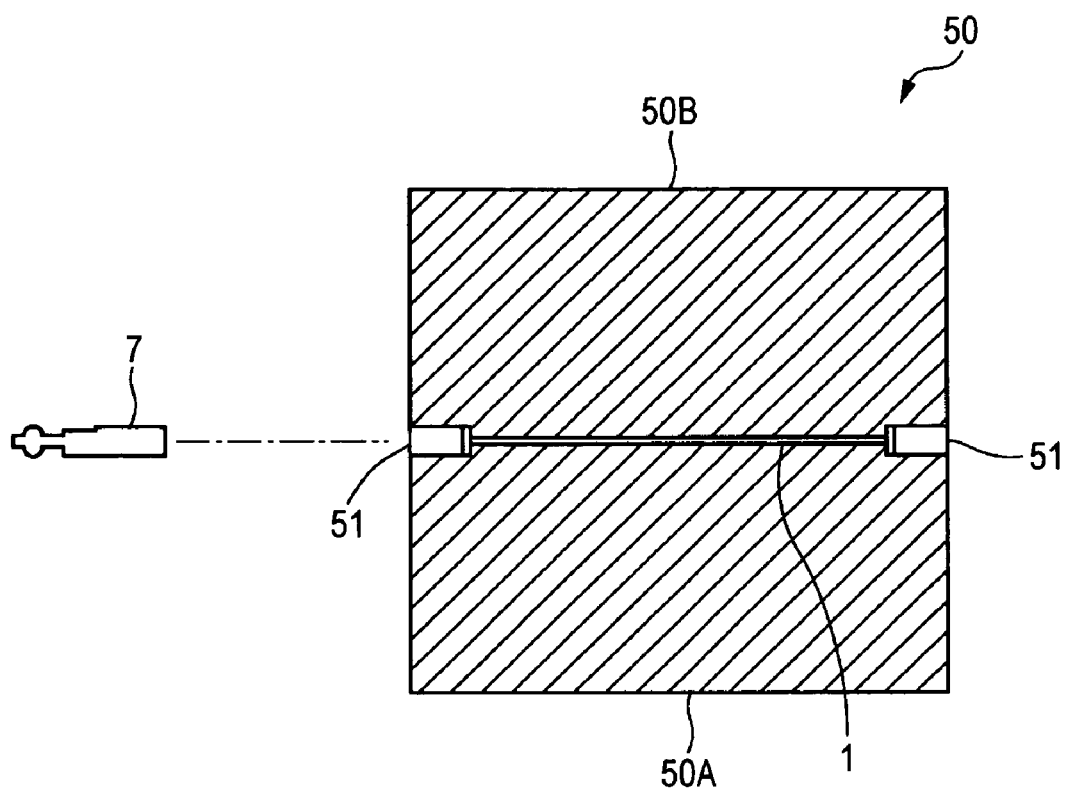
FIG. 6 is a conceptual diagram showing an example of a microreactor apparatus in which integral connectors are not disposed.

As shown in FIG. 6, rectangular acrylic resin plates 50A and 50B which are identical with those used in Example 1 were used, and a microchannel (width; 500 µm, depth: 100 µm) which is identical with that of Example 1 was formed in the acrylic resin plate 5A by using an end mill. Thereafter, the acrylic resin plates 50A and 50B were fusion bonded together by diffusion bonding, thereby producing a microreactor body 50 having a microchannel in the bonding surface. Holes 51 (φ5 mm×9 mm in depth) into which joints are to be fitted, and each of which is centered at an end portion of the microchannel were bored by a drill, and then threaded. O-rings were inserted into the holes, and the joints were attached by screwing.

In order to check the performance, ion-exchange water was supplied, with the result that a normal flow was observed.

Thereafter, a liquid toner dispersion was supplied by a syringe pump, and a clog occurred. The place where a clog occurred was observed by a microscope, and it was found that shavings produced in the boring entered the channel. It was tried to remove the shavings. However, the shavings could not be removed away. In order to remove the shavings, an ultrasonic washing machine was used. However, the shavings could not be removed away.

When a liquid toner dispersion was supplied by a syringe pump, the liquid leaked from the interfaces between the joints and the threaded portions. When the joints were further fastened in order to prevent leakage from occurring, the bonding portion peeled off.

What is claimed is:

1. A microreactor apparatus comprising:
   a microreactor body that includes first and second substrates;
   a microchannel that is formed inside the microreactor body;
   integral connectors that are disposed detachably on the microreactor body, and through which supply/discharge pipes are to be connected to end portions of the microchannel, respectively, wherein each of the integral connectors comprises:
   a connector body;
   a joint member that is fixed to the connector body, and to which the supply/discharge pipe is connectable; and
   a fixing member that detachably fixes the connector body to the microreactor body, wherein
   the microreactor body includes an engaging hole provided at a position on a surface of the microreactor body except for the end portions of the microchannel, and
   the connector body is fixed to the microreactor body by engaging the fixing member with the engaging hole.

2. The microreactor apparatus as claimed in claim 1, wherein
   the microreactor body has a bonding surface formed by bonding together each one surface of the first and second substrates, and
   the microchannel is formed in the bonding surface.

3. The microreactor apparatus as claimed in claim 1, wherein the microreactor body has cutaway portions at the end portions of the microchannel.

4. The microreactor apparatus as claimed in claim 1, which comprises a closing member containing an elastic member, the closing member being attached between each of the connector bodies and the microreactor body.

5. The microreactor apparatus as claimed in claim 4, wherein the first and second substrates contain a thermoplastic resin.

6. The microreactor apparatus as claimed in claim 1, wherein a center axis of the joint member coincides with an axis of the end portions of the microchannel, the axis extending through a shaft center of an aperture plane of the end portions in a direction perpendicular to the aperture plane thereof.

7. The microreactor apparatus as claimed in claim 1, wherein the integral connectors are disposed detachably on the microreactor body by a first fixing member and a second fixing member.

8. The microreactor apparatus as claimed in claim 1, wherein the integral connectors are disposed detachably on the microreactor body by a first fixing member for connection with the first substrate and by a second fixing member for connection with the second substrate.

* * * * *